United States Patent [19]

Libit

[11] Patent Number: 5,084,599
[45] Date of Patent: Jan. 28, 1992

[54] WARNING LIGHT SWITCH FOR A VEHICLE

[76] Inventor: Sidney M. Libit, 441 Lakeside Ter., Glencoe, Ill. 60022

[21] Appl. No.: 557,932

[22] Filed: Jul. 25, 1990

[51] Int. Cl.⁵ .............................................. H01H 3/14
[52] U.S. Cl. ................................. 200/61.89; 200/86.5
[58] Field of Search .......... 200/61.89, 86.5, DIG. 35; 340/467, 464

[56] References Cited

U.S. PATENT DOCUMENTS

| | | |
|---|---|---|
| 2,219,351 | 10/1940 | Worrall . |
| 2,812,402 | 11/1957 | Dixon ................................. 200/86.5 |
| 2,822,441 | 2/1958 | Fortney . |
| 3,304,381 | 2/1967 | McAnespey . |
| 3,427,583 | 2/1969 | Zackey ............................ 200/61.89 |
| 3,548,134 | 12/1970 | Harthan, Jr. ...................... 200/86.5 |
| 3,638,181 | 6/1972 | Bryant . |
| 3,912,892 | 10/1975 | Morehouse . |
| 4,455,466 | 6/1984 | Wilson . |
| 4,497,989 | 2/1985 | Miller . |

*Primary Examiner*—Harold Broome
*Attorney, Agent, or Firm*—Hill, Van Santen, Steadman & Simpson

[57] ABSTRACT

A safety switch connected to a rear stop light that is mounted under the heel of a driver so as to indicate when the drivers' heel leaves the floor to warn following drivers of braking.

1 Claim, 1 Drawing Sheet

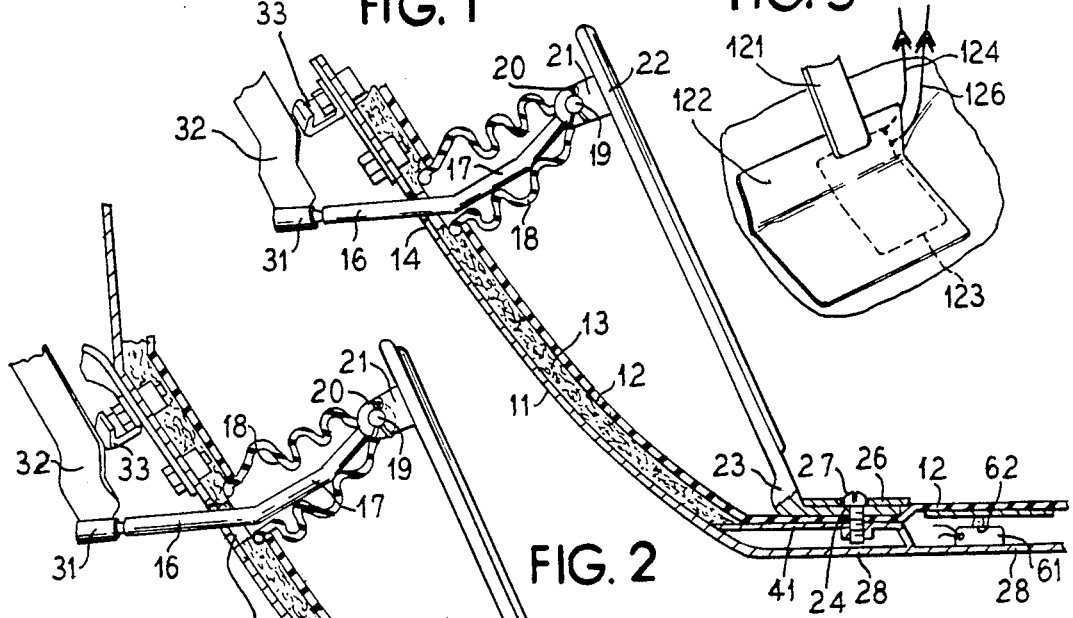
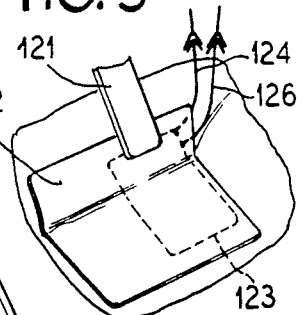
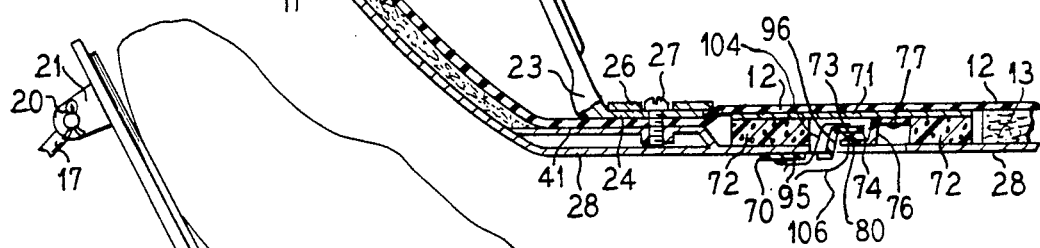
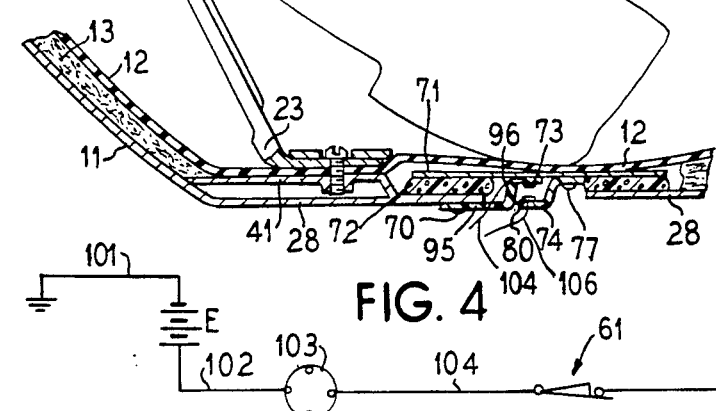
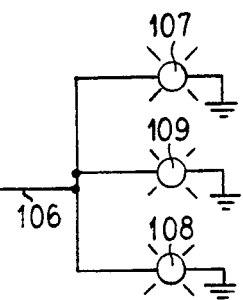

WARNING LIGHT SWITCH FOR A VEHICLE

BACKGROUND OF THE INVENTION

1. Field of the Invention

This invention relates in general to warning lights for vehicles such as automobiles and trucks wherein when the driver lifts his accelerator foot from the floor, a warning light such as the tail lights or warning in the rear window of the vehicle is illuminated.

2. Description of the Prior Art

It is known to have a vehicle system wherein a rear light is illuminated when the driver releases the accelerator. U.S. Pat. No. 3,427,583 discloses a safety signal for vehicles which has a combination switches one of which is connected to the accelerator and the other is connected so that it is engaged by the heel of the driver's accelerator foot such that if both switches are closed a first rear warning light will be illuminated and if the accelerator switch is closed another light will be illuminated.

See also U.S. Pat. Nos. 4,497,989, 4,455,466, 2,219,351, 2,822,441, 3,304,381, 3,427,583, 3,638,181 and 3,912,892.

SUMMARY OF THE INVENTION

It is an object of the present invention to provide a rear warning light which is actuated when the driver removes his accelerator foot from the floor board of the vehicle, a warning light will be illuminated to warn drivers behind him that he may be contemplating applying the brakes.

It is a feature of the present invention that a heel engaged switch is placed adjacent the accelerator pedal and is connected to the rear stop lights such that when the heel of the driver's accelerator foot is removed from the floor board one or more warning lights will be illuminated.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a side sectional view illustrating a first embodiment of the invention;

FIG. 2 is a sectional view illustrating a second embodiment of the invention;

FIG. 3 is a view illustrating the warning switch in the open position;

FIG. 4 is an electrical schematic of the invention; and

FIG. 5 is a perspective view of a modification.

DESCRIPTION OF THE PREFERRED EMBODIMENTS

FIG. 1 illustrates an accelerator 22 of the vehicle. A floor board 11 of the vehicle is covered by the floor mat 12 which comprises an upper cover 12 as, for example, of rubber and a cushioning pad 13 connected to the layer 12. An opening 14 is formed in the floor board 11 and a throttle shaft 16 extends therethrough and is connected by coupling 31 to the throttle lever 32 to actuate the throttle of the vehicle. A stop 33 limits the throttle shaft 32 motion in the counterclockwise direction relative to FIG. 2. The upper end 17 of shaft 16 is connected by pin 19 to a bracket 21 which is connected to the upper end of the accelerator pedal 22. A cotter pin 20 passes through an opening in the shaft 19 as shown. A cover gasket 18 fits over the shaft portion 17 and it is attached to the floor mat 12 as shown. The lower end 23 of pedal 22 has a projection 24 which is connected to the extension 41 of the floor wall 28 of the vehicle by set screw 27 and a washer 26. Behind the washer 26 relative to FIG. 1 the padding 13 is removed for a short distance and a switch 61 as, for example, a microswitch with a switch contact 62 is mounted to the floor wall 28 as shown. The floor mat portion 12 passes over the contact 62 of the microswitch 61 and when the driver's foot engages the accelerometer his heel depresses the floor mat 12 and the switch contact 62 so as to open the normally closed microswitch 61. When the driver removes his heel from the floor mat 12, the switch contact 62 moves upwardly thus closing switch 61 to illuminate one or more of the rear warning lights of the vehicle.

FIG. 2 illustrates a modification of the invention wherein a donut-shaped pad 72 of, for example, sponge rubber is placed against the floor wall 28 adjacent the washer 26 in an area where the backpadding 13 of the floor mat has been removed. A metal plate 71 is attached to sponge rubber pad 72 and carries a switch contact 76 which is connected by a rivet 77 to the plate 71. A lower portion of the switch contact 76 carries a switch contact portion 80 which when the driver's heel does not engage the floor mat 12 makes contact with a switch contact 73 of a switch member 95 which is connected by a rivet 70 to the floor wall 28. The switch portion 95 has an insulating portion 96 between the switch contact 73 and the floor wall 28.

FIG. 4 is an electrical schematic of the signal device of the invention. A lead 101 is connected to the ground of the vehicle and passes through a battery E which has another lead 102 which is connected to the ignition switch 103 of the vehicle. A lead 104 connects from the ignition switch 103 to the microswitch 61. The other side of the microswitch is connected to a lead 106 which is connected to a pair of stop lights 107, 108 and a stop light 109 which can be mounted in the rear window of the vehicle. Although in the electrical schematic the microswitch 61 is illustrated, it is to be realized that the switch comprising the switch members 76 and 95 can be utilized in place of the switch 61.

FIG. 5 illustrates a modification wherein the accelerator 121 is supported through the fire wall of the vehicle such that a floor mat 122 of the invention could be thrown under the accelerator without making any changes in the accelerator or floor connections of the vehicle. A portion 123 under the heel of the right foot of the drive contains a switch which can be of the type shown in FIG. 1 or FIG. 2 that is normally closed when the driver's heel is not on it and which opens when engaged by the drivers' heel. A pair of electrical leads 124 and 126 can be connected under the dash to the electrical circuitry so that the warning lights can be illuminated.

The purchaser of the invention shown in FIG. 5 can purchase the floor mat and place it under the accelerator 121 and then connect the wires 124 and 126. The switch is not effected in any manner by the accelerator, but only by the heel of the driver.

In operation when the driver's foot is not on the floor mat 12 of the vehicle, the switch 61 in the embodiment of FIG. 1 and the switch contacts 80 and 73 in the embodiment of FIGS. 2 and 3 will be in contact so that the stop lights 107, 108 and 109 will be lighted when the ignition switch 103 is closed. As soon as the driver places his heel on the floor pad 12 as shown in FIG. 3, for example, the switch 61 will be opened in the embodiment of FIG. 1 and the switch contacts 80 and 73 will be separated in the embodiment illustrated in FIGS. 2 and 3 so that the tail lights 107, 108 and 109 will not be illuminated. The lights 107, 108 and 109 will continue to be not illuminated until the driver lifts his heel from the floor mat 12 which allow the switch 61 to close since the switch contact 62 moves upwardly when released by the heel in the embodiment of FIG. 1. In the embodiment of FIGS. 2 and as shown in FIG. 2 when the heel is removed from the floor mat 12 the contacts 73 and 80 will be engaged to light the lights 107, 108 and 109.

Thus, it is seen that the present invention provides a novel combination of a heel switch for illuminating the rear warning lights when the operator lifts his heel from the floor mat 12 which occurs when the driver plans to brake for example.

The installation of the present invention is very simple in that the floor mat is lifted and the padding 13 in the area where the switch 61 is to be mounted is removed from the floor mat layer 12 and the switch 61 is installed as, for example, by gluing or bolting to the floor wall 28. In the embodiments illustrated in FIG. 2 or 3, the backing pad 13 is removed from the floor mat portion 12 in an area which is large enough to allow the donut-shape pad 72, the plate 71 and the switch contacts 74 and 95 to be installed.

Although the invention has been described with respect to preferred embodiments, it is not to be so limited as changes and modifications can be made which are within the full intended scope of the invention as defined by the appended claims.

I claim as my invention:

1. In an automobile having a floor, an accelerator pedal moveable relative to the floor by being depressed by the foot of a driver when the heel is on the floor, a stoplight mounted on the automobile, a floor mat with padding mounted on said floor, a portion of said padding removed under the heel of said driver and a normally closed switch connected to said stoplight mounted to said floor under said floor mat in the area where said padding has been removed, wherein said switch comprises a resilient pad formed with a central opening, a plate on said resilient pad and under said mat at a location in which said padding has been removed from said mat, a first switch contact mounted on said plate, a second switch contact insulatingly attached to said floor and engageable with said first switch contact when the heel of the driver is not on the floor and moved out of engagement when the heel of the driver is on the floor, and wherein said resilient pad is doughnut-shaped.

* * * * *